(12) United States Patent
Inohiza

(10) Patent No.: US 12,432,804 B2
(45) Date of Patent: Sep. 30, 2025

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 18/062,997

(22) Filed: Dec. 7, 2022

(65) Prior Publication Data

US 2023/0108880 A1    Apr. 6, 2023

Related U.S. Application Data

(63) Continuation of application No. PCT/JP2021/020216, filed on May 27, 2021.

(30) Foreign Application Priority Data

Jun. 16, 2020 (JP) ................. 2020-103908

(51) Int. Cl.
 *H04W 76/15* (2018.01)
 *H04W 12/0471* (2021.01)
 *H04W 12/06* (2021.01)

(52) U.S. Cl.
 CPC ....... *H04W 76/15* (2018.02); *H04W 12/0471* (2021.01); *H04W 12/06* (2013.01)

(58) Field of Classification Search
 None
 See application file for complete search history.

(56) References Cited

U.S. PATENT DOCUMENTS

| | | |
|---|---|---|
| 2008/0175213 A1 | 7/2008 | Hansen |
| 2010/0332822 A1 | 12/2010 | Liu |
| 2012/0144199 A1 | 6/2012 | Hamachi |
| 2015/0026453 A1 | 1/2015 | Liu |

(Continued)

FOREIGN PATENT DOCUMENTS

| | | |
|---|---|---|
| CN | 105681326 A | 6/2016 |
| JP | 2012531817 A | 12/2012 |

(Continued)

OTHER PUBLICATIONS

Po-Kai Huang, et al. (Intel); "Multi-link Security Consideration"; doc.: IEEE 802.11-19/1822r9; Nov. 5, 2019; pp. 1-18.

(Continued)

*Primary Examiner* — Otis L Thompson, Jr.
(74) *Attorney, Agent, or Firm* — Canon U.S.A., Inc. IP Division

(57) ABSTRACT

A communication apparatus capable of performing multilink communication conforming to the IEEE802.11 standard series includes a connection unit configured to establish a first link and a second link via a frequency channel, and a setting unit configured to set, in a case where a communication apparatus as a connection partner in the first link established by the connection unit is same as a communication apparatus as a connection partner in the second link established by the connection unit, a Pairwise Transient Key (PTK) to be shared between communication via the first link and communication via the second link.

13 Claims, 9 Drawing Sheets

(56) References Cited

U.S. PATENT DOCUMENTS

| | | | |
|---|---|---|---|
| 2016/0044507 A1* | 2/2016 | Agiwal | H04W 12/02 |
| | | | 370/328 |
| 2016/0049996 A1 | 2/2016 | Wang | |
| 2016/0344712 A1* | 11/2016 | Ding | H04L 9/30 |
| 2016/0360404 A1* | 12/2016 | Benoit | H04W 12/04 |
| 2017/0070343 A1 | 3/2017 | Patil | |
| 2017/0265238 A1* | 9/2017 | Li | H04W 48/16 |
| 2019/0082373 A1 | 3/2019 | Patil et al. | |
| 2019/0349397 A1* | 11/2019 | Li | H04W 12/71 |
| 2020/0267541 A1* | 8/2020 | Huang | H04W 12/10 |
| 2020/0404496 A1* | 12/2020 | Chu | H04W 52/0216 |
| 2021/0050999 A1* | 2/2021 | Huang | H04L 9/088 |
| 2021/0126947 A1* | 4/2021 | Wang | H04L 63/18 |
| 2021/0211871 A1* | 7/2021 | Chu | H04W 12/06 |
| 2023/0224710 A1* | 7/2023 | Huang | H04W 12/06 |
| | | | 726/5 |

FOREIGN PATENT DOCUMENTS

| | | |
|---|---|---|
| JP | 2018050133 A | 3/2018 |
| WO | 2020110575 A1 | 6/2020 |

OTHER PUBLICATIONS

Guogang Huang, et al. (Huawei); "Discussion on Multi-link Setup"; doc.: IEEE 802.11-20/1534r1; Sep. 2, 2020; pp. 1-18.

Po-Kai Huang, et al. (Intel); "Extremely Efficient Multi-band Operation"; doc.: IEEE 80211-19/0822r7; May 12, 2019; pp. 1-30.

Huizhao Wang, et al. (Quantenna); "Multi-link Device Instance & New Frame MAC Header"; doc.: IEEE 802.11-19/1962r2; pp. 1-16.

In-sun Jang (LG Electronics), Discussion on Multi-link Setup, IEEE 802.11-19/1509r4, Sep. 16, 2019, pp. 1-14.

Huizhao Wang (Quantenna/On Semi), Multi-Link Device Instance & New Frame MAC Header, IEEE 802.11-19/1962r2, Nov. 7, 2019, pp. 1-16.

Po-Kai Huang (Intel), Extremely Efficient Multi-band Operation, IEEE 802.11-19/0822r7, May 12, 2019, pp. 1-30.

Po-Kai Huang (Intel), Multi-link security consideration, IEEE 802.11-19/1822r8, Nov. 5, 2019, pp. 1-17.

Huizhao Wang (Quantenna/ON Semi), Multi-Link Upper-MAC Entity Instance & New Frame MAC Header, IEEE. 802.11-19/1962r2, IEEE, Oct. 2019 < URL:https://mentor.ieee.org/802.11/dcn/19/11-19-1962-02-00be-multi-link-upper-mac-entity-instance-new-frame-mac-header.pptx > , Mar. 13, 2020.

IEEE P802.11 Wireless LANs Minutes for TGbe MAC Ad-Hoc teleconferences in March and May 2020.

* cited by examiner

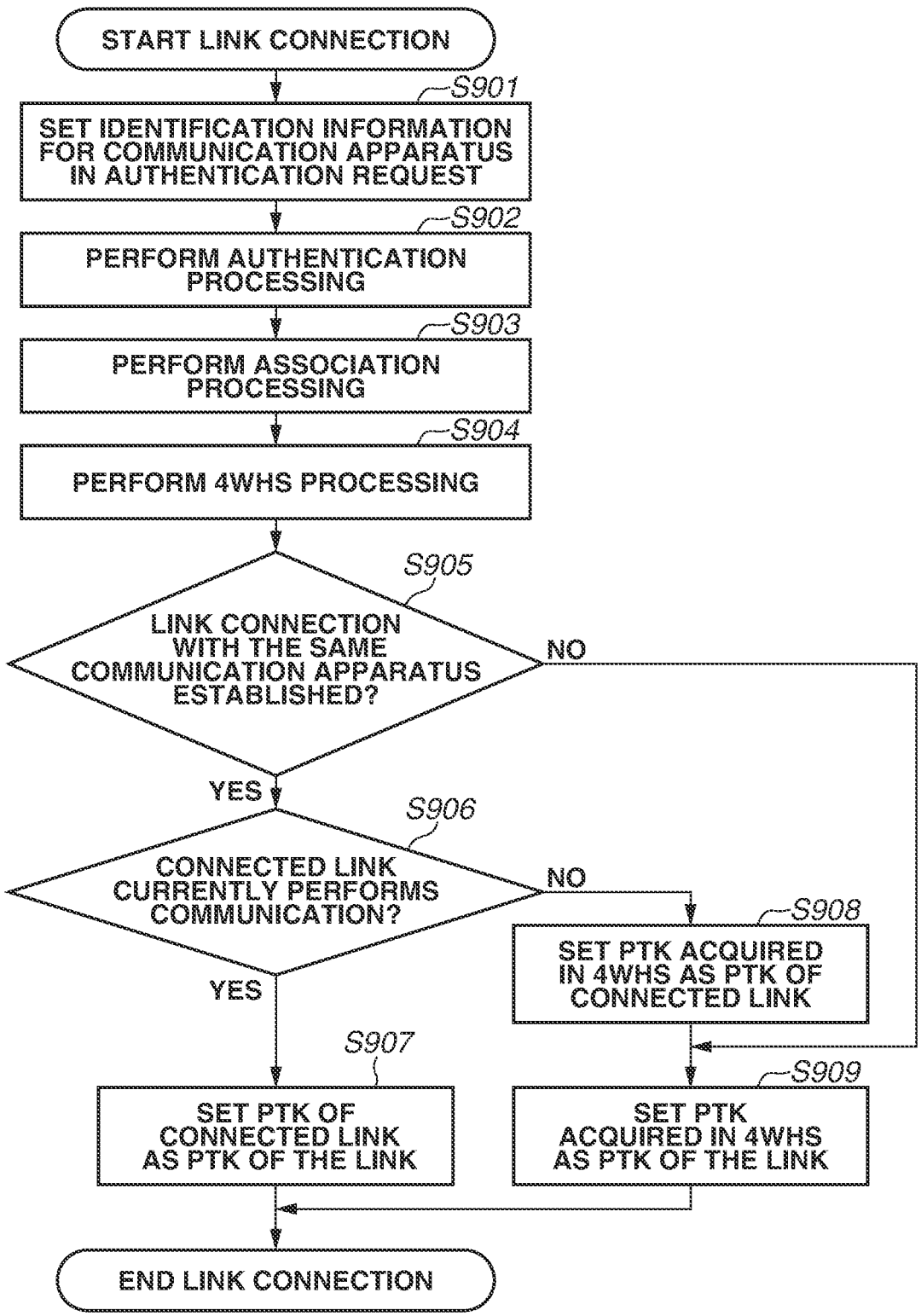

COMMUNICATION APPARATUS, COMMUNICATION METHOD, AND STORAGE MEDIUM

CROSS-REFERENCE TO RELATED APPLICATIONS

This application is a Continuation of International Patent Application No. PCT/JP2021/020216, filed May 27, 2021, which claims the benefit of Japanese Patent Application No. 2020-103908, filed Jun. 16, 2020, both of which are hereby incorporated by reference herein in their entireties.

BACKGROUND OF THE INVENTION

Field of the Invention

The present invention relates to a communication apparatus for wireless communication, and a wireless communication method.

Background Art

The IEEE802.11 series is known as a Wireless Local Area Network (WLAN) communication specification standard developed by the Institute of Electrical and Electronics Engineers (IEEE). WLAN is an abbreviation for Wireless Local Area Network. The IEEE802.11 series standard includes the IEEE802.11a/b/g/n/ac/ax standards.

Patent Document 1 discloses execution of wireless communication using, in a case of communication conforming to the IEEE802.11ax standard, Orthogonal Frequency Division Multiple Access (OFDMA). The IEEE802.11ax standard achieves a high peak throughput by execution of wireless communication using OFDMA.

The IEEE has been studying the development of the IEEE802.11be standard as a new standard of the IEEE802.11 series to further improve the throughput and the frequency use efficiency. In the IEEE802.11be standard, a technique for establishment of a plurality of connections by an Access Point (AP) with a Station (STA) via a plurality of different frequency channels has being studied to achieve wireless communication at higher speeds.

CITATION LIST

Patent Literature

PTL 1: Japanese Patent Laid-Open No. 2018-50133

Each data frame transmitted by a communication apparatus is assigned a Sequence Number (SN) indicating the order of data transmission. The SN is used to rearrange data frames when the reception order of data frames is changed on the reception side. In data transmission, a Pairwise Transient Key (PTK) as an encryption key is used. In encryption of data frames by using the PTK, a Packet Number (PN) is added to each of the data frames. In a case where a data frame assigned a PN smaller than PNs of received data frames is received when rearrangement of the data frames is performed on the reception side, the reception side determines that a replay attack occurs, and subsequently received data frames are discarded.

In a case of communication via a plurality of frequency channels, when an error occurs in a data frame transmitted via a first frequency channel, for example, the data frame can be retransmitted via a second frequency channel having a favorable communication quality. In this case, if different PTKs are used between the frequency channels, PNs added in the data frame encryption are inconsistent between the frequency channels.

When the data frames received via a plurality of frequency channels are rearranged in the order of SNs, there is a possibility that a PN of a data frame received via the second frequency channel is smaller than a PN of a data frame received via the first frequency channel. Consequently, there has been an issue that normal data frames received via the second frequency channel are discarded.

SUMMARY OF THE INVENTION

In view of the above-described issue, the present invention is directed to preventing a normal data frame from being discarded in a connection established between communication apparatuses via a plurality of frequency channels.

To achieve the above-described object, a communication apparatus capable of performing multilink communication conforming to the IEEE802.11 standard series includes a connection unit configured to establish a first link and a second link via a frequency channel, and a setting unit configured to set, in a case where a communication apparatus as a connection partner in the first link established by the connection unit is same as a communication apparatus as a connection partner in the second link established by the connection unit, a Pairwise Transient Key (PTK) to be shared between communication via the first link and communication via the second link.

Further features of the present invention will become apparent from the following description of exemplary embodiments with reference to the attached drawings.

BRIEF DESCRIPTION OF THE DRAWINGS

FIG. 9 is a flowchart illustrating link connection processing of the communication apparatus 103.

DESCRIPTION OF THE EMBODIMENTS

Exemplary embodiments of the present invention will be described in detail below with reference to the accompanying drawings. Configurations according to the following exemplary embodiments are to be considered as illustrative, and the present invention is not limited to illustrated configurations.

Figure 1:
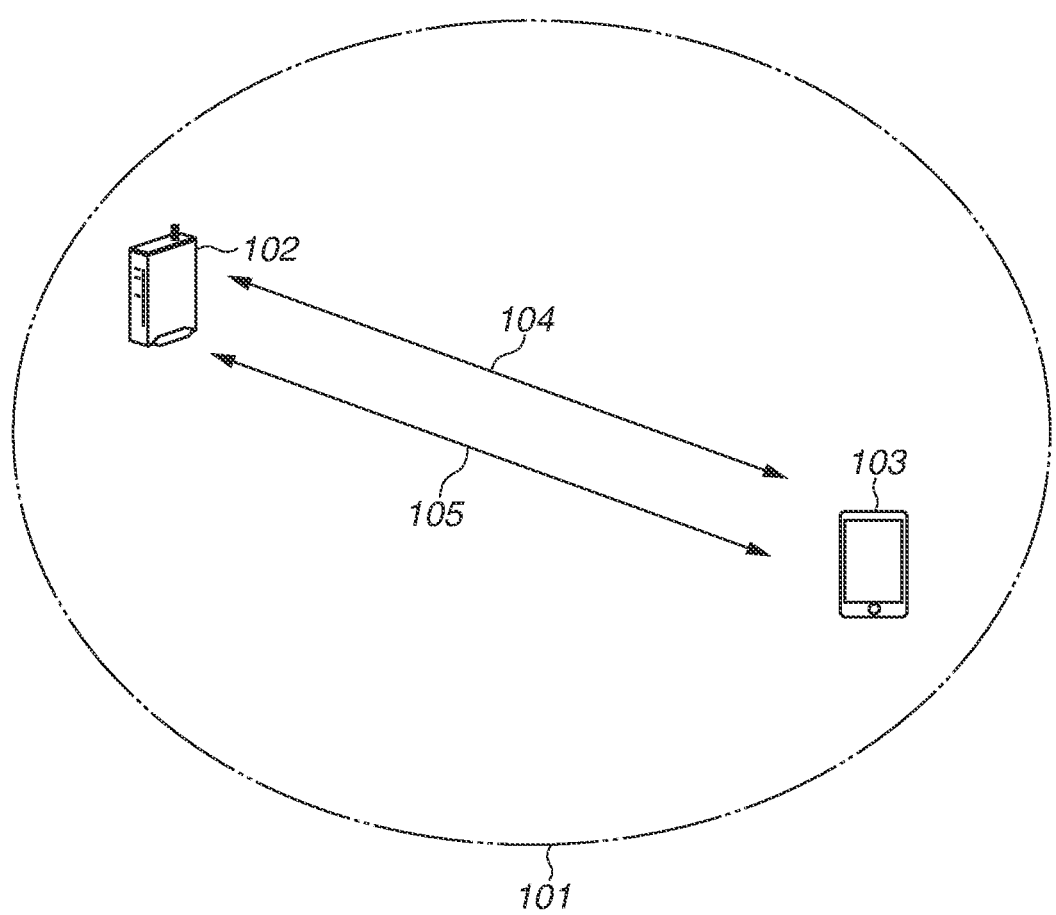
FIG. 1 is a diagram illustrating a network configuration established by a communication apparatus 102.

FIG. 1 illustrates a configuration of a network established by a communication apparatus 102 according to the present exemplary embodiment. The communication apparatus 102 is an Access Point (AP) having a role of establishing a network 101. The network 101 is a wireless network. According to the present exemplary embodiment, when the communication apparatus 102 establishes a plurality of networks, all of the networks have the same Basic Service Set Identifier (BSSID). BSSID is an abbreviation for Basic Service Set Identifier as a network identifier. The communication apparatus 102 shares the same Service Set Identifier (SSID) to all of the networks. SSID is an abbreviation for Service Set Identifier that is used as an AP identifier. The present exemplary embodiment uses one SSID even in a case where the communication apparatus 102 establishes a plurality of connections.

A communication apparatus 103 is a Station (STA) having a role of participating in the network 101. Each communication apparatus supporting the Institute of Electrical and Electronics Engineers (IEEE) 802.11be standard can perform wireless communication conforming to the IEEE802.11be standard via the network 101. IEEE is an abbreviation for Institute of Electrical and Electronics Engineers. EHT is an abbreviation for Extremely High Throughput. EHT can be interpreted to be an abbreviation for Extreme High Throughput. Each communication apparatus can perform communication in the 2.4 GHz, 5 GHz, and 6 GHz frequency bands. The frequency bands that are used by each communication apparatus are not limited to the above-described frequency bands. For example, a different frequency bands, such as the 60 GHz band, can also be used by a communication apparatus. Each communication apparatus can perform communication by using the 20 MHz, 40 MHz, 80 MHz, 160 MHz, and 320 MHz frequency bands.

The communication apparatuses 102 and 103 perform Orthogonal Frequency Division Multiple Access (OFDMA) communication conforming to the IEEE802.11be standard to implement Multi User (MU) communication that multiplexes signals of a plurality of users. OFDMA is an abbreviation for Orthogonal Frequency Division Multiple Access. In OFDMA communication, divided frequency bands called Resource Unit (RU) are each assigned to a different STA in a manner not overlapping with each other, and carriers assigned to respective STAs are orthogonal to each other. Thus, the AP can communicate with a plurality of STAs in parallel.

The communication apparatuses 102 and 103 establish a link via a plurality of frequency channels and perform multilink communication. The frequency channels are frequency channels defined in the IEEE802.11 series standard and refers to frequency channels that can perform wireless communication conforming to the IEEE802.11 series standard. In the IEEE802.11 series standard, a plurality of frequency channels is defined in each of the 2.4 GHz, 5 GHz, and 6 GHz frequency bands. In the IEEE802.11 series standard, the bandwidth for each frequency channel is defined as 20 MHz. A bandwidth of 40 MHz or higher created by channel bonding of adjacent frequency channels may be used in a frequency channel. For example, the communication apparatuses 102 and 103 can establish a first link 104 via a first frequency channel in the 2.4 GHz band and a second link 105 via a second frequency channel in the 5 GHz band to communicate with each other via both of the links. In this case, the communication apparatus 102 maintains the second link 105 via the second frequency channel in parallel with the first link 104 via the first frequency channel. The communication apparatus 102 establishes links via a plurality of frequency channels with communication apparatus 103 in this way, whereby the throughput in communication with the communication apparatus 103 can be improved. The communication apparatuses 102 and 103 may establish a plurality of links in different frequency bands in multilink communication. For example, the communication apparatuses 102 and 103 may establish the first link 104 in the 2.4 GHz band, the second link 105 in the 5 GHz band, and a third link in the 6 GHz band. Alternatively, the communication apparatuses 102 and 103 may establish links via a plurality of different channels included in the same frequency band. For example, the communication apparatuses 102 and 103 may establish the first link 104 via channel 1 in the 2.4 GHz band and the second link 105 via channel 5 in the 2.4 GHz band. Links in the same frequency band and in different frequency bands can also be established. For example, the communication apparatuses 102 and 103 may establish the third link via channel 36 in the 5 GHz band in addition to the first link 104 via channel 1 in the 2.4 GHz band and the second link 105 via channel 5 in the 2.4 GHz band. Establishment of a plurality of connections in different frequency bands with the communication apparatus 103 in this way allows the communication apparatus 102 to communicate, when a certain band is in congestion, with the communication apparatus 103 in other bands, which prevents degradation in the throughput in communication with the communication apparatus 103.

In multilink communication, a plurality of links established between the communication apparatuses 102 and 103 need to be at least different in frequency channels. In multilink communication, the interval between frequency channels of a plurality of links established by the communication apparatuses 102 and 103 needs to be larger than at least 20 MHz. While, in the present exemplary embodiment, the communication apparatuses 102 and 103 establish the first link 104 and the second link 105, the two communication apparatuses may establish three or more links.

In multilink communication, the communication apparatuses 102 and 103 divide one piece of data into several pieces and transmit these pieces of data to the partner apparatus via a plurality of links. Alternatively, the communication apparatuses 102 and 103 may transmit the same data via each of a plurality of links to use communication via one link as a backup communication for communication via other links. More specifically, the communication apparatus 102 transmits the same data to the communication apparatus 103 by using the first link via the first frequency channel and by using the second link via the second frequency channel. In this case, even in a case where an error occurs in communication via the first link, for example, the communication apparatus 103 can receive data transmitted from the communication apparatus 102 since the communication apparatus 102 transmits the same data to the communication apparatus 103 via the second link. Alternatively, the communication apparatuses 102 and 103 may use different links according to the type of frame and the type of data to be communicated. For example, the communication apparatus 102 may transmit a management frame via the first link and a data frame containing data via the second link. More specifically, the management frame refers to a Beacon frame, a Probe Request frame, a Probe Response frame, an Association Request frame, and an Association Response frame. In addition to these frames, a Disassociation frame, an Authentication frame, a De-Authentication frame, and an Action frame are also referred to as the management frame. The Beacon frame is a frame to announce network information. The Probe Request frame is a frame to request network information. The Probe Response frame is a frame to provide network information as a response to the Probe Request frame. The Association Request frame is a frame to request a connection. The Association Response frame is a frame to indicate a connection permission or an error as a response to the Association Request frame. The Disassociation frame is a frame to disconnect a connection. The Authentication frame is a frame to authenticate a partner apparatus. The De-Authentication frame is a frame to cancel the authentication of the partner apparatus and disconnect a connection. The Action frame is a frame to perform an additional function other than the above-described frames. The communication apparatuses 102 and 103 transmit and receive management frames conforming to the IEEE802.11 series standard. Alternatively, when the communication apparatus 102 transmits data related to a captured image, for example, the communication apparatus 102 may transmit meta information, such as the date, imaging parameters (diaphragm stop and shutter speed), and positional information, via the first link, and transmit pixel information via the second link.

The communication apparatuses 102 and 103 may be able to perform Multiple-Input Multiple-Output (MIMO) communication. In this case, the communication apparatuses 102 and 103 have a plurality of antennas, and one communication apparatus transmits different signals from these antennas by using the same frequency channel. The reception side receives at the same time all of the signals from a plurality of streams by using a plurality of antennas, separates the signals in each stream, and decodes the signals. Thus, the communication apparatuses 102 and 103 can communicate more data in the same time period by performing MIMO communication than in a case where MIMO communication is not performed. When performing multilink communication, the communication apparatuses 102 and 103 may perform MIMO communication via some links.

While the communication apparatuses 102 and 103 conform to the IEEE802.11be standard, these apparatuses may conform to at least either one of legacy standards earlier than the IEEE802.11be standard in addition to the IEEE802.11be standard. The legacy standards include the IEEE802.11a/b/g/n/ac/ax standards. According to the present exemplary embodiment, at least either one of the IEEE802.11a/b/g/n/ac/ax/be standards and succeeding standards is referred to as the IEEE802.11 series standard. In addition to the IEEE802.11 series standard, the communication apparatuses 102 and 103 may conform to other communication standards, such as Bluetooth®, Near Field Communication (NFC), Ultra Wide Band (UWB), Zigbee, and Multi Band OFDM Alliance (MBOA). UWB is an abbreviation for Ultra Wide Band, and MBOA is an abbreviation for Multi Band OFDM Alliance. OFDM is an abbreviation for Orthogonal Frequency Division Multiplexing. NFC is an abbreviation for Near Field Communication. UWB includes wireless USB, wireless 1394, and Winet. The communication apparatuses 102 and 103 may conform to the wired communication standard, such as wired LAN.

While specific examples of the communication apparatus 102 include a wireless Local Area Network (LAN) router and a personal computer (PC), the present invention is not limited thereto. The communication apparatus 102 may be any communication apparatus capable of performing multilink communication with other communication apparatuses. The communication apparatus 102 may also be an information processing apparatus, such as a wireless chip, capable of performing wireless communication conforming to the IEEE802.11be standard. While specific examples of the communication apparatus 103 include a camera, a tablet, a smart phone, a PC, a portable phone, and a video camera, the present invention is not limited thereto. The communication apparatus 103 may be any communication apparatus capable of performing multilink communication with other communication apparatuses. The communication apparatus 103 may also be an information processing apparatus, such as a wireless chip, capable of performing wireless communication conforming to the IEEE802.11be standard. The network in FIG. 1 includes one AP and one STA, the number of APs and the number of STAs are not limited thereto. The information processing apparatus, such as a wireless chip, has an antenna for transmitting a generated signal.

Figure 2:
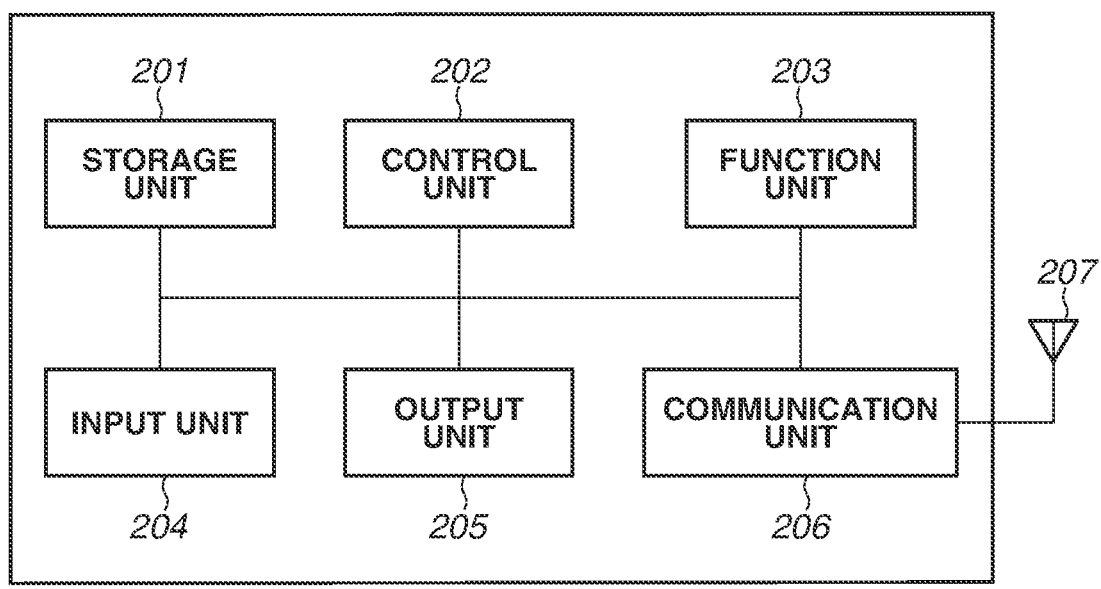
FIG. 2 is a diagram illustrating a hardware configuration of the communication apparatus 102 and a communication apparatus 103.

FIG. 2 illustrates a hardware configuration of the communication apparatuses 102 and 103 according to the present exemplary embodiment. Each of the communication apparatuses 102 and 103 include a storage unit 201, a control unit 202, a function unit 203, an input unit 204, an output unit 205, a communication unit 206, and an antenna 207.

The storage unit 201 includes at least one memory, such as a Read Only Memory (ROM) and a Random Access Memory (RAM), and stores computer programs for implementing various operations (described below) and various information, such as communication parameters for wireless communication. ROM is an abbreviation for Read Only Memory, and RAM is an abbreviation for Random Access Memory. Storage media usable as the storage unit 201 include not only the ROM and the RAM but also a storage medium, such as a flexible disk, a hard disk, an optical disc, a magneto-optical disk, a compact disc read only memory (CD-ROM), a compact disc recordable (CD-R), a magnetic tape, a nonvolatile memory card, and a digital versatile disc (DVD). The storage unit 201 may also include a plurality of memories.

The control unit 202 includes, for example, at least one processor, such as a Central Processing Unit (CPU) and a Micro Processing Unit (MPU), and executes computer programs stored in the storage unit 201 to control the entire communication apparatus 102. The control unit 202 may control the entire communication apparatus 102 by a collaboration of computer programs and an Operating System (OS) stored in the storage unit 201. The control unit 202 generates data and signals (wireless frames) to be transmitted in communication with other communication apparatuses. CPU is an abbreviation for Central Processing Unit, and MPU is an abbreviation for Micro Processing Unit. The control unit 202 may also include a plurality of processors, such as a multi-core processor, and control the entire communication apparatus 102 by using the plurality of processors.

The control unit 202 also controls the function unit 203 to execute wireless communication, image capturing, printing, projection, and other predetermined processing. The function unit 203 is a hardware component for enabling the communication apparatus 102 to perform predetermined processing.

The input unit 204 receives various operations from the user. The output unit 205 performs various output operations to the user via a monitor screen and a speaker. The output operations by the output unit 205 include display on the monitor screen and sound output from the speaker. The input unit 204 and the output unit 205 may be implemented as one module like a touch panel. Each of the input unit 204 and the output unit 205 may be integrally configured with the communication apparatus 102 or separately configured therefrom.

The communication unit 206 controls wireless communication conforming to the IEEE802.11be standard. The communication unit 206 may control wireless communication conforming not only to the IEEE802.11be standard but also to other IEEE802.11 series standards and control wire-lined communication using, for example, a wire-lined LAN. The communication unit 206 controls the antenna 207 to transmit and receive wireless communication signals generated by the control unit 202. In a case where the communication apparatus 102 conforms to not only the IEEE802.11be standard but also the Near Field Communication (NFC) or the Bluetooth® standard, the communication unit 206 may control wireless communication conforming to these communication standards. In a case where the communication apparatus 102 can perform wireless communication conforming to a plurality of communication standards, the communication apparatus 102 may include communication units and antennas individually conforming to the respective communication standards. The communication apparatus 102 communicates image data, document data, video data, and other data with the communication apparatus 103 via the communication unit 206. The antenna 207 may be configured separately from the communication unit 206 or configured integrally with the communication unit 206.

The antenna 207 supports communication in the 2.4 GHz, 5 GHz, and 6 GHz bands. While, in the present exemplary embodiment, the communication apparatus 102 is provided with one antenna, the communication apparatus 102 may have different antennas for respective frequency bands. In a case where the communication apparatus 102 has a plurality of antennas, the communication apparatus 102 may include the communication unit 206 for supporting each of the antennas.

Figure 3:
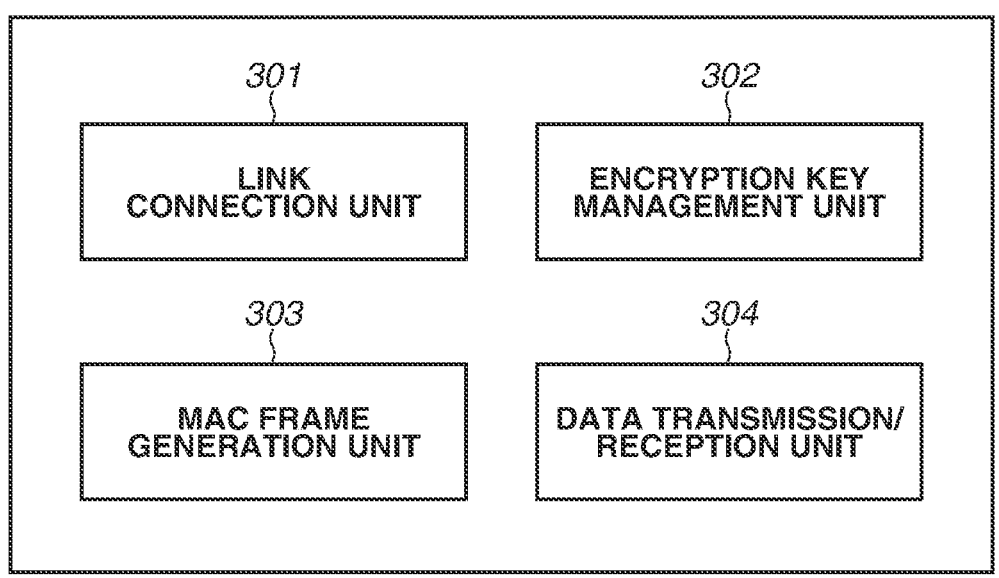
FIG. 3 is a diagram illustrating a functional configuration of the communication apparatus 102 and the communication apparatus 103.

FIG. 3 illustrates a functional configuration of the communication apparatuses 102 and 103 according to the present exemplary embodiment. Each of the communication apparatuses 102 and 103 includes a link connection unit 301, an encryption key management unit 302, a Media Access Control (MAC) frame generation unit 303, and a data transmission/reception unit 304.

The link connection unit 301 is a block that performs connection processing for establishment of at least one link to be used for data communication between the communication apparatuses 102 and 103. The connection processing specifically includes Authentication processing, Association processing, and 4 Way Handshake processing (4WHS processing). By the 4WHS processing, a PTK as the encryption key for unicast communication and a GTK as the encryption key for broadcast and multicast communications are shared by the communication apparatuses 102 and 103. PTK is an abbreviation for Pairwise Transient Key, and GTK is an abbreviation for Group Transient Key. In a case where the communication apparatus 102 connects with the communication apparatus 103, the communication apparatus 102 may have established a connection via a plurality of links in advance, and also may establish a connection via a different link during communication via a predetermined link.

The encryption key management unit 302 is a block that manages the encryption key for each of the links acquired by the link connection unit 301. According to the present exemplary embodiment, the encryption key management unit 302 manages the PTK serving as the encryption key for encryption of unicast communication and the GTK serving as the encryption key for encryption of broadcast and multicast communications.

The MAC frame generation unit 303 is a block that generates a MAC frame to be included in various management frames, such as Authentication Request and Association Request, and data frames.

The data transmission/reception unit 304 transmits wireless frames including the MAC frame generated by the MAC frame generation unit 303 and receives wireless frames from the partner apparatus.

Figure 4:
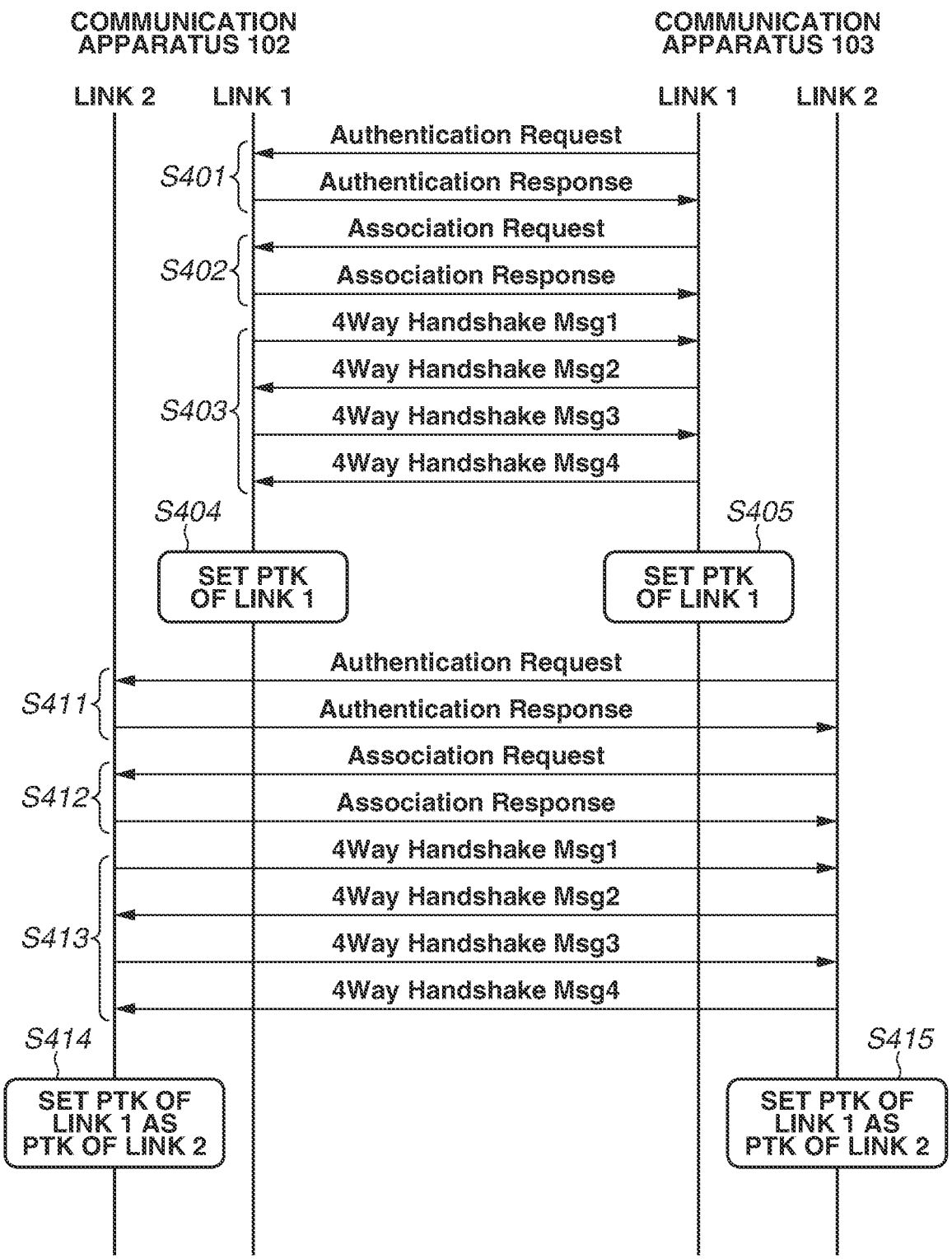
FIG. 4 is a sequence diagram illustrating multilink connection processing.

FIG. 4 is a sequence diagram of processing in a case where the communication apparatuses 102 and 103 perform multilink connection processing. The present exemplary embodiment will be described below centering on an example where two links are used. For example, in a link 1, the communication apparatuses 102 and 103 perform communication via channel 1 of the 2.4 GHz band in the first frequency channel. In a link 2, the communication apparatuses 102 and 103 perform communication via channel 36 of the 5 GHz band in the second frequency channel.

The present exemplary embodiment will be described below centering on an example where an encryption key set in the link 1 is set as an encryption key of the link 2.

In step S401, the communication apparatuses 102 and 103 perform the Authentication processing for the link 1 in the first frequency channel. The communication apparatus 103 transmits an Authentication Request frame to issue an authentication request. Then, the communication apparatus 102 transmits an Authentication Response frame as a response to the request. In a case where the Simultaneous Authentication of Equals (SAE) authentication method is used in step S401, the Authentication Request frame and the Authentication Response frame are exchanged several times. SAE is an abbreviation for Simultaneous Authentication of Equals.

In step S402, the communication apparatuses 102 and 103 perform the Association processing for the link 1. The communication apparatus 103 transmits an Association Request frame for a connection. Then, the communication apparatus 102 transmits an Association Response frame as a response to the request.

In step S403, the communication apparatuses 102 and 103 perform the 4WHS processing to generate an encryption key to be used for communication of the link 1. Firstly, the PMK to be used for encryption of communication between the communication apparatuses 102 and 103 is generated and notified from an authentication server to the communication apparatus 102. The PMK is used for the PTK generation in the 4WHS processing. Then, the communication apparatus 102 exchanges random numbers, called Snonce and Anonce, with the communication apparatus 103 in 4WHS Message 1 and 4WHS Message 2, and generates a PTK based on the PMK and these random numbers. The PTK includes three different keys: a Key Encryption Key (KEK), a Key Confirmation Key (KCK), and a Temporary Key (TK). The TK is used for encryption in unicast communication, and the KCK is used for encryption in broadcast or multicast communication. In 4WHS Message 3, the communication apparatus 102 transmits the GTK generated by the communication apparatus 102 to share the GTK between the communication apparatuses 102 and 103. After step S403, then in step S404, the communication apparatus 102 sets the PTK, which is generated in step S403 and serves as the encryption key to be used for unicast communication, to the wireless chip as the PTK of the link 1. Likewise, in step S405, the communication apparatus 103 also sets the PTK of the link 1 to the wireless chip.

Subsequently, after establishment of the link 1, the communication apparatuses 102 and 103 perform connection processing for the link 2 in a state where the connection via the link 1 has been established. The connection processing of the link 2 may be performed immediately after the connection processing of the link 1 or after a predetermined time period has elapsed. Processing in steps S411, S412, and S413 is similar to the processing in steps S401, S402, and S403, respectively. Since the PTK is generated by using random numbers, a PTK different from the PTK acquired in the processing in step S403 is acquired. However, in step S414, in a case where an already established link exists, the communication apparatus 102 sets the PTK set in the link 1 as the PTK of the link 2 without using the PTK acquired in step S413. Likewise, in step S415, the communication apparatus 103 also sets the PTK of the link 1 as the PTK of the link 2. As described above, the PTK can be shared between links in a case where multilink connection is performed. The common encryption key includes a replicated one.

Figure 5:
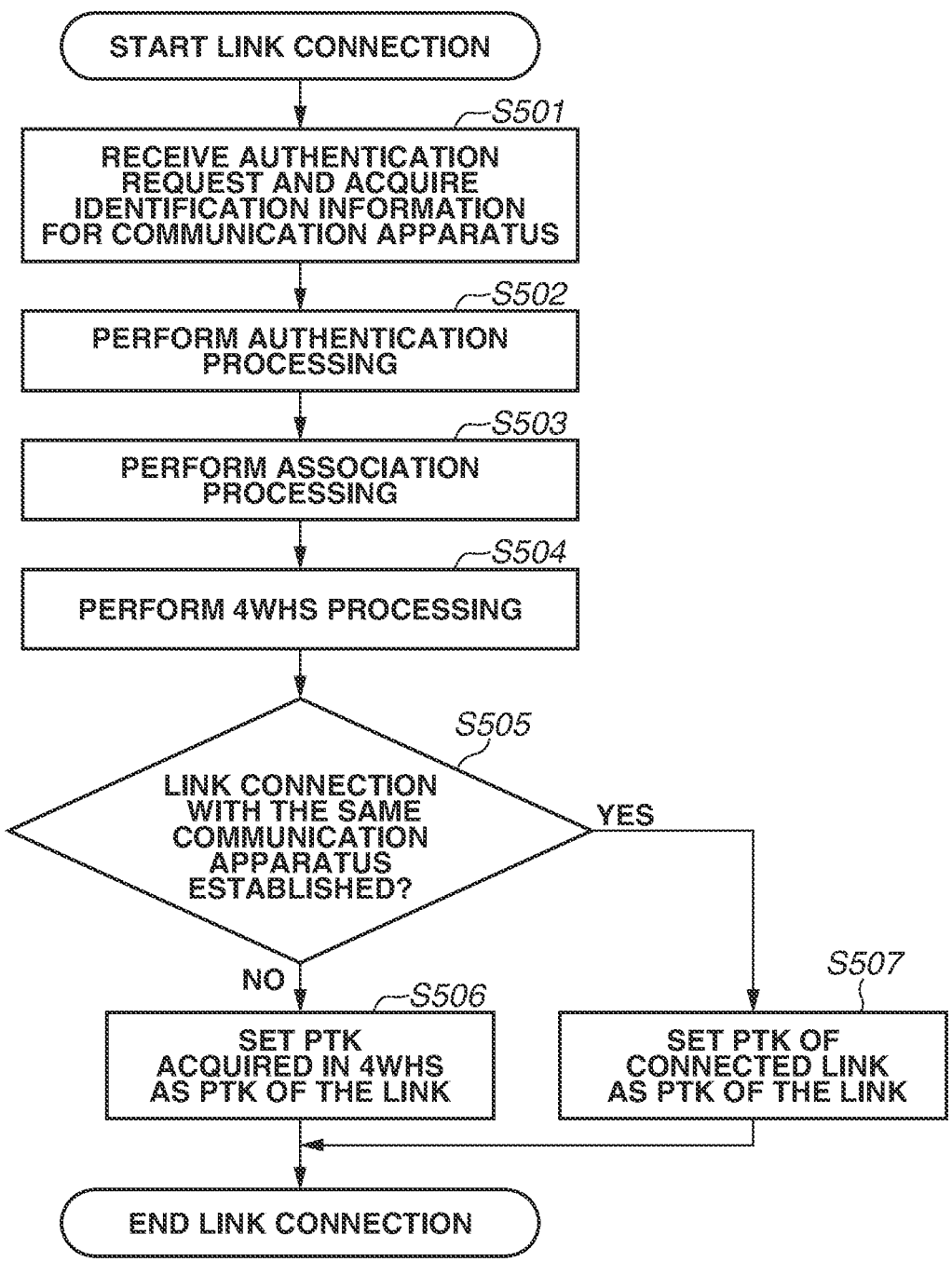
FIG. 5 is a flowchart illustrating link connection processing of the communication apparatus 102.

FIG. 5 is a flowchart illustrating a processing procedure for determination of a PTK to be set to a link by the control unit 202 executing a program stored in the storage unit 201 of the communication apparatus 102.

This processing is started when power of the communication apparatus 102 is turned ON. Alternatively, the communication apparatus 102 may start the processing in response to receipt of an instruction for starting multilink communication from the user or an application. Alternatively, the communication apparatus 102 may start the processing when the amount of data to be communicated with the partner apparatus becomes a predetermined threshold value or larger.

In step S501, the communication apparatus 102 receives an Authentication Request frame from the communication apparatus 103 via the link 1 and acquires information to identify a communication apparatus. This identification information is used to determine whether a link with the communication apparatus 103 has already been established. Examples of identification information include Multi-Link Device ID (MLD ID) but the present invention is not limited thereto. In step S502, in response to the Authentication Request frame received in step S501, the communication apparatus 102 transmits an Authentication Response frame to the communication apparatus 103 to perform the Authentication processing. After completion of the Authentication processing, then in step S503, in response to receipt of an Association Request frame from the communication apparatus 103, the communication apparatus 102 performs processing for transmission of an Association Response frame to the communication apparatus 103. After completion of the Association processing, then in step S504, the communication apparatus 102 performs the 4WHS processing with the communication apparatus 103 to generate a PTK serving as an encryption key. In step S505, the communication apparatus 102 determines whether the communication apparatus established the connection via the link 1 is same as the communication apparatus established the connection via the link 2. Since there is no communication apparatus established a connection earlier, then in step S506, the communication apparatus 102 sets the PTK acquired in the link 1 to the wireless chip as the PTK of the link 1. This completes the connection processing of the link 1.

Then, in step S501, the communication apparatus 102 receives an Authentication Request frame from the communication apparatus 103 via the link 2 and acquires information to identify a communication apparatus. This identification information is used to determine whether a link with the communication apparatus 103 has already been established. In step S502, in response to the Authentication Request frame received in step S501, the communication apparatus 102 transmits an Authentication Response frame to the communication apparatus 103 to perform the Authentication processing. After completion of the Authentication processing, then in step S503, in response to receipt of an Association Request frame from the communication apparatus 103, the communication apparatus 102 performs processing for transmission of an Association Response frame to the communication apparatus 103. After completion of the Association processing, then in step S504, the communication apparatus 102 performs the 4WHS processing with the communication apparatus 103 to generate a PTK serving as an encryption key. In step S505, the communication apparatus 102 determines whether the communication apparatus established the connection via the link 1 is same as the communication apparatus established the connection via the link 2. More specifically, the communication apparatus 102 determines whether the identification information on the communication apparatus included in the Authentication Request frame in step S501 coincides with the identification information on the communication apparatus that has established the connection via the link 1. In a case where it is determined that the communication apparatuses are the same communication apparatus (YES in step S505), then in step S507, the communication apparatus 102 sets the PTK set in the link 1 as the PTK of the link 2. In step S507, the communication apparatus 102 sets the PTK of the link 1 to the wireless chip as the PTK of the link 2 without using the PTK generated in the 4WHS processing of the link 2. In a case where it is determined that the communication apparatuses are not the same communication apparatus (NO in step S505), then in step S506, the communication apparatus 102 sets the PTK generated in the 4WHS processing for the link 2 to the wireless chip as the PTK of the link 2. In step S506, the PTK generated in the 4WHS processing for the link 2 is set to the encryption key management unit 302 as the PTK of the link connected. This completes the connection processing of the link 2.

Figure 6:
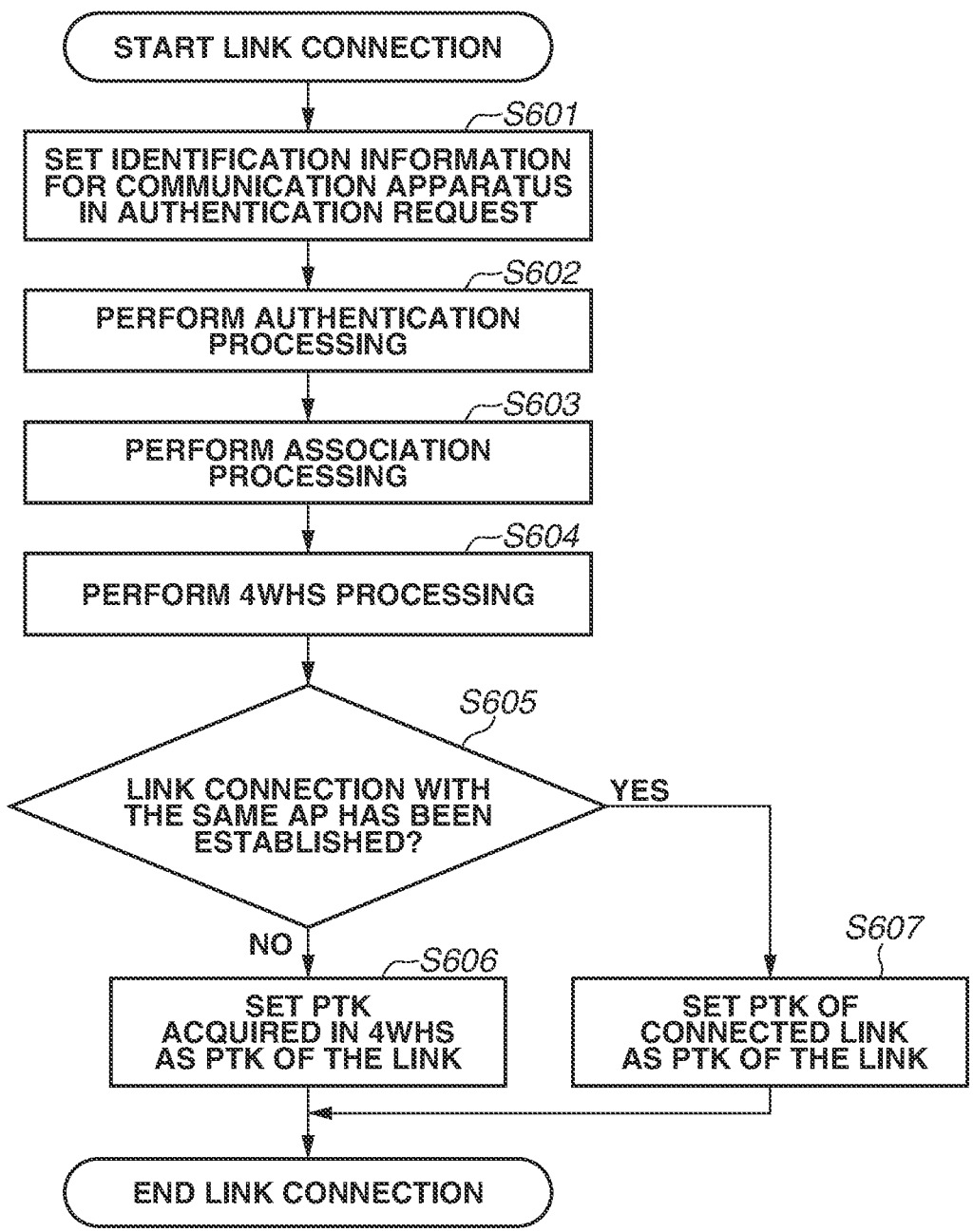
FIG. 6 is a flowchart illustrating a first example of link connection processing of the communication apparatus 103.

FIG. 6 is a flowchart illustrating a processing procedure for determination of a PTK to be set to a link by the control unit 202 executing a program stored in the storage unit 201 of the communication apparatus 103.

The processing is started when power of the communication apparatus 103 is turned ON. Alternatively, the communication apparatus 103 may start the processing in response to receipt of an instruction for starting multilink communication from the user or an application. Alternatively, the communication apparatus 103 may start the processing when the amount of data to be communicated with the partner apparatus becomes a predetermined threshold value or larger.

In step S601, the communication apparatus 103 stores the identification information on the communication apparatus 102 in an Authentication Request frame in the link 1. This information is used to determine whether a link with the communication apparatus 102 has already been established. The communication apparatus 103 acquires the identification information on the communication apparatus 102 when the user selects the communication apparatus 102 as a connection destination by using a user interface (UI) and then starts a connection, or when the communication apparatus 103 performs scanning, finds the communication apparatus 102 as a connection destination, and automatically starts a connection. In step S602, the communication apparatus 103 performs processing for transmitting the Authentication Request frame set in step S601 and receiving an Authentication Response frame from the communication apparatus 102. After completion of the Authentication processing, then in step S603, the communication apparatus 102 performs processing for transmitting an Association Request frame and receiving an Association Response frame from the communication apparatus 102. After completion of the Association processing, then in step S604, the communication apparatus 103 performs the 4WHS processing with the communication apparatus 102 to generate a PTK serving as an encryption key. In step S605, the communication apparatus 103 determines whether the communication apparatus established the connection via the link 1 is same as the communication apparatus established the connection via the link 2. Since there is no communication apparatus established a connection earlier, then in step S606, the communication apparatus 103 sets the PTK acquired in the link 1 to the wireless chip as the PTK of the link 1. This completes the connection processing of the link 1.

Then, in step S601, the communication apparatus 103 stores the identification information on the communication apparatus 102 in an Authentication Request frame in the link 2. This information is used to determine whether a link has already been connected with the communication apparatus 102. In step S602, the communication apparatus 103 performs processing for transmitting the Authentication Request frame set in step S601 and receiving an Authentication Response frame from the communication apparatus 102. After completion of the Authentication processing, then in step S603, the communication apparatus 103 performs processing for transmitting an Association Request frame and receiving an Association Response frame from the communication apparatus 102. After completion of the Association processing, then in step S604, the communication apparatus 103 performs the 4WHS processing with the communication apparatus 102 to generate a PTK as an encryption key. In step S605, the communication apparatus 103 determines whether the communication apparatus established the connection via the link 1 is same as the communication apparatus established the connection via the link 2. More specifically, the communication apparatus 103 determines whether the identification information on the communication apparatus 102 set in the Authentication Request frame in step S601 coincides with the identification information on the communication apparatus 102 that has established the connection via the link 2. In a case where it is determined that the communication apparatuses are the same communication apparatus (YES in step S605), then in step S607, the communication apparatus 103 sets the PTK set in the link 1 as the PTK of the link 2. On the other hand, in a case where it is determined that the communication apparatuses are not the same communication apparatus (NO in step S605), then in step S606, the communication apparatus 103 sets the PTK generated in the 4WHS processing for the link 2 to the wireless chip as the PTK of the link 2. In step S606, the communication apparatus 102 sets the PTK generated in the 4WHS processing for the link 2 to the encryption key management unit 302 as the PTK of the link 2.

While, in the present exemplary embodiment, the identification information on the communication apparatus is stored in the Authentication Request frame, the identification information may be stored, for example, in the Association Request frame.

According to the present exemplary embodiment, in a case where it is determined that the same communication apparatus has been established the connection via the link 1 and the connection via the link 2, the PTK can be shared between the links by setting the encryption key set in the link 1 as the encryption key of the link 2. Using the PTK shared between the links 1 and 2 enables communication without discarding normal data frames.

Second Exemplary Embodiment

Figure 7:
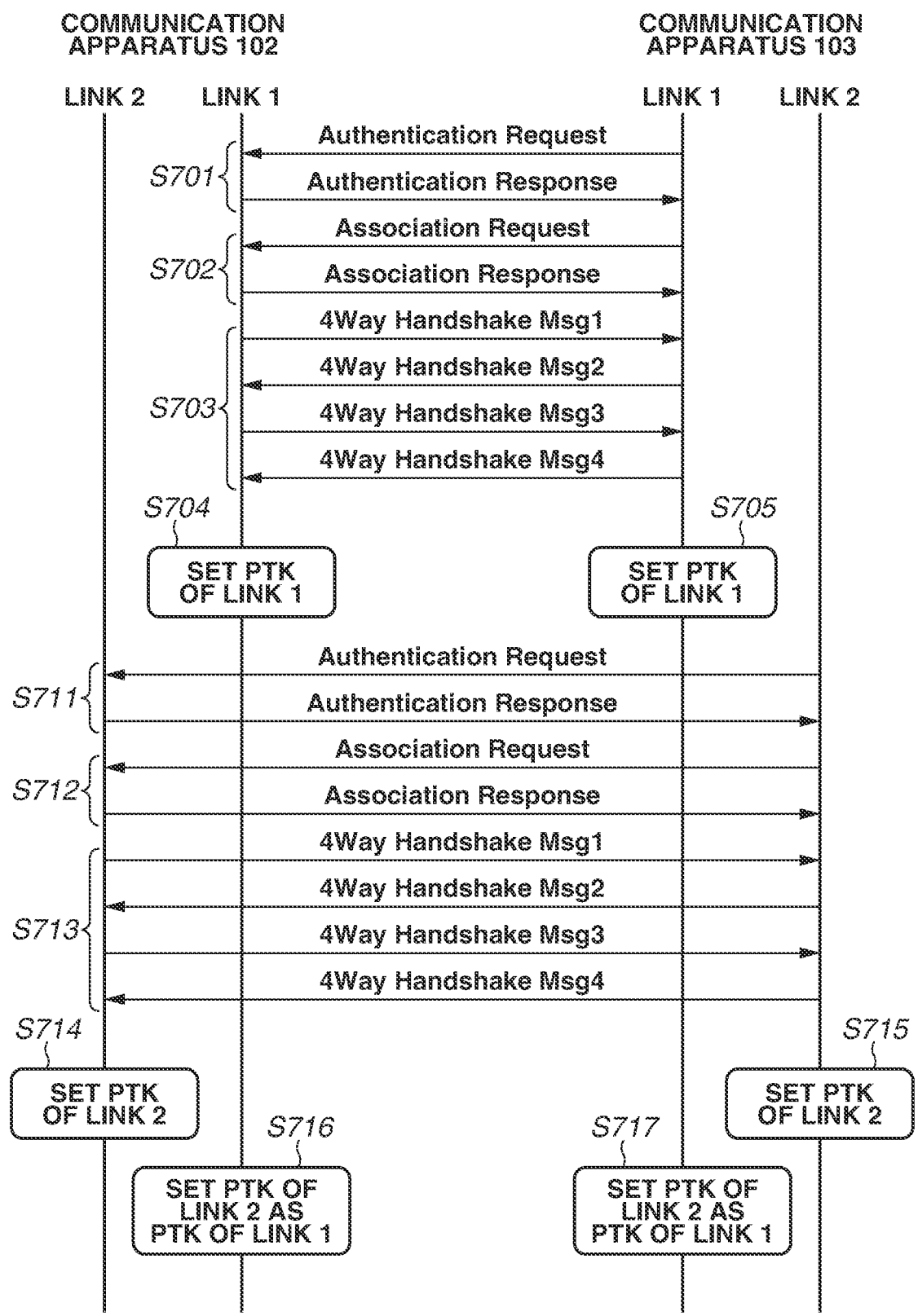
FIG. 7 is a sequence diagram illustrating multilink connection processing.

FIG. 7 is a sequence diagram of processing in a case where the communication apparatuses 102 and 103 perform multilink connection processing. A second exemplary embodiment will be described below centering on a case where two links are used. For example, in the link 1, the communication apparatuses 102 and 103 perform communication via channel 1 of the 2.4 GHz band in the first frequency channel. In the link 2, the communication apparatuses 102 and 103 perform communication via channel 36 of the 5 GHz band in the second frequency channel.

The present exemplary embodiment will be described below centering on a method for resetting the PTK of the link 1 by using the PTK set in the link 2 to share the PTK between the links.

Processing in steps S701 to S713 as the connection processing for the link 1 is similar to the processing in steps S401 to S413 in FIG. 4, respectively, and the redundant descriptions will be omitted. As a result of processing in step S713, even though a PTK different from the PTK acquired in the processing in step S703 is acquired, the communication apparatus 102 sets the PTK as the PTK of the link 2 in step S714 and performs resetting of the PTK of the link 1 by using the PKT of the link 2 in step S716. Likewise, the communication apparatus 103 sets the PTK as the PTK of the link 2 in step S715 and performs resetting of the PTK of the link 1 by using the PTK of the link 2 in step S717. As described above, the PTK can be shared between the links when multilink connection is performed. The common encryption key includes a replicated one.

Figure 8:
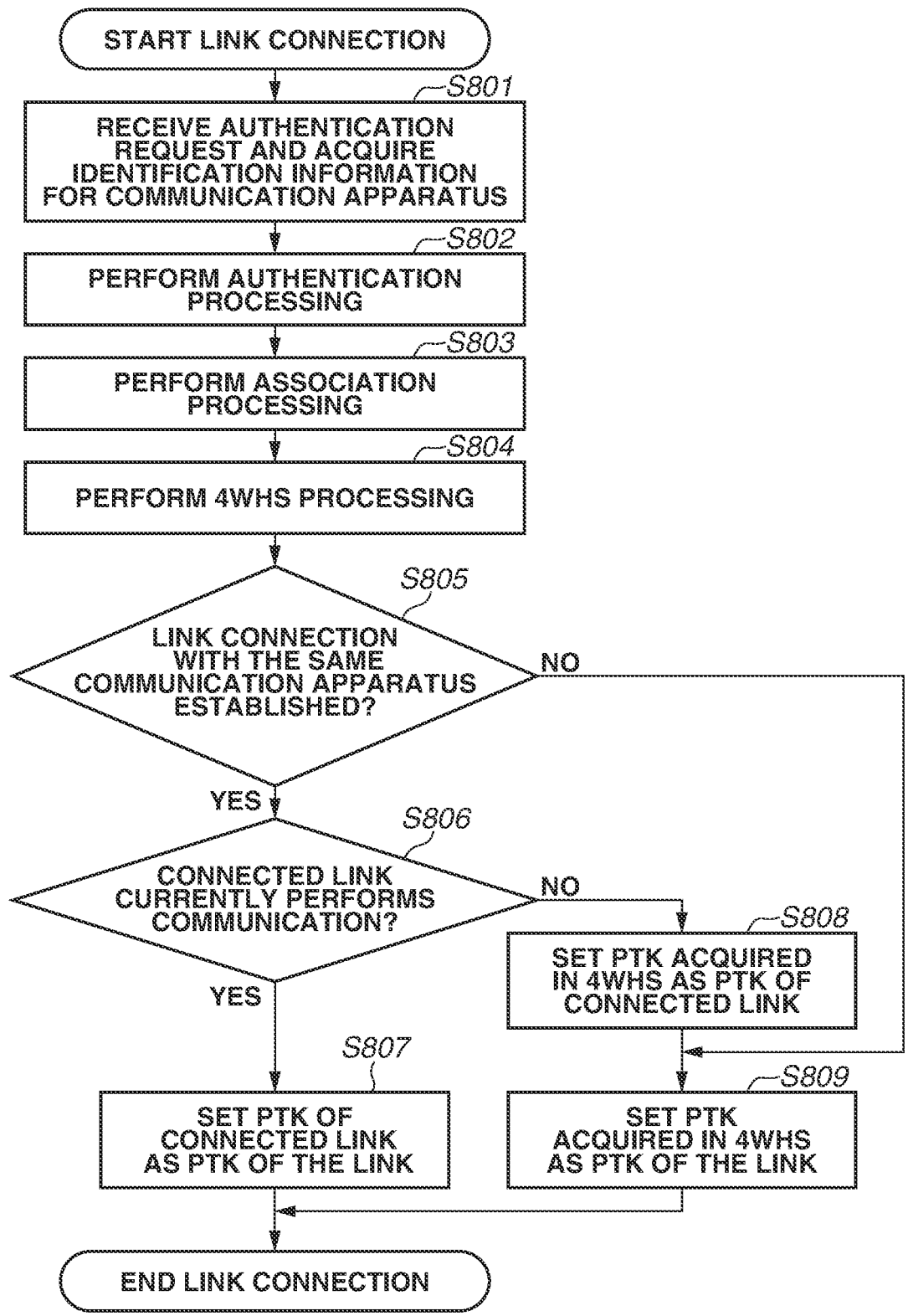
FIG. 8 is a flowchart illustrating link connection processing of the communication apparatus 102.

FIG. 8 is a flowchart illustrating a processing procedure for determination of a PTK to be set to a link by the control unit 202 executing a program stored in the storage unit 201 of the communication apparatus 102. Processing in steps S801 to S804 is similar to the processing in steps S501 to S504 in FIG. 5, respectively, and the redundant description will be omitted.

In step S801, the communication apparatus 102 receives an Authentication Request frame from the communication apparatus 103 via the link 1 and acquires information to identify the communication apparatus. This identification information is used to determine whether a link with the communication apparatus 103 has been established. Examples of identification information include Multi-Link Device ID (MLD ID) but the present invention is not limited thereto. In step S802, in response to the Authentication Request frame received in step S801, the communication apparatus 102 transmits an Authentication Response frame to the communication apparatus 103 to perform the Authentication processing. After completion of the Authentication processing, then in step S803, the communication apparatus 102 performs processing for receiving an Association Request frame from the communication apparatus 103 and then transmitting an Association Response frame to the communication apparatus 103. After completion of the Association processing, then in step S804, the communication apparatus 102 performs the 4WHS processing with the communication apparatus 103 to generate a PTK serving as an encryption key. In step S805, the communication apparatus 102 determines whether the communication apparatus established the connection via the link 1 is same as the communication apparatus established the connection via the link 2. Since there is no communication apparatus established a connection earlier, then in step S809, the communication apparatus 102 sets the PTK set in the link 1 to the wireless chip as the PTK of the link 1. This completes the connection processing for the link 1.

Then, in step S801, the communication apparatus 102 receives an Authentication Request frame from the communication apparatus 103 in the link 2 and acquires information to identify a communication apparatus. Steps S801 to S804 in the link 2 are as described above. In step S805, the communication apparatus 102 determines whether the communication apparatus established the connection via the link 1 is same as the communication apparatus established the connection via the link 2. More specifically, the communication apparatus 102 determines whether the identification information on the communication apparatus set in the Authentication Request frame in step S801 coincides with the identification information on the communication apparatus that has established the connection via the link 1. In a case where it is determined that the communication apparatuses are the same communication apparatus (YES in step S805), then in step S806, the communication apparatus 103 determines whether data communication is currently performed via the link 1. In a case where the communication apparatus 102 determines that data communication is currently performed via the link 1 (YES in step S806), then in step S807, the communication apparatus 103 sets the PTK of the link 1 to the wireless chip as the PTK of the link 2 without updating the PTK of the link currently performing data communication. This is because updating the PTK of the link currently performing data communication will interrupt data communication. In a case where the communication apparatus 102 determines that data communication is not currently performed via the link 1 (NO in step S806), then in step S808, the communication apparatus 102 sets the PTK generated in the 4WHS processing for the link 2 to the wireless chip as the PTK of the link 1. In step S809, the communication apparatus 102 further sets the PTK generated in the 4WHS processing for the link 2 to the wireless chip as the PTK of the link 2. In a case where it is determined that the communication apparatuses are not the same communication apparatus (NO in step S805), then in step S809, the communication apparatus 102 sets the PTK generated in the 4WHS processing for the link 2 to the wireless chip, as the PTK of the link 2.

While, in the present exemplary embodiment, the identification information on the communication apparatus is stored in an Authentication Request frame, the information may be stored in a different frame, for example, in an Association Request frame.

FIG. 9 is a flowchart illustrating a processing procedure for determination of a PTK to be set to a link by the control unit 202 executing a program stored in the storage unit 201 of the communication apparatus 103.

Processing in steps S901 to S904 for the link 1 is similar to the processing in steps S601 to S604 in FIG. 6, respectively, and the redundant descriptions will be omitted.

In step S901, the communication apparatus 103 stores the identification information on the communication apparatus 102 in an Authentication Request frame in the link 1. This information is used to determine whether a link with the communication apparatus 102 has been established. The communication apparatus 103 acquires the identification information on the communication apparatus 102 when the user selects the communication apparatus 102 as a connection destination by using a user interface (UI) and then starts a connection, or when the communication apparatus 103 performs scanning, finds the communication apparatus 102 as a connection destination, and automatically starts a connection. In step S902, the communication apparatus 103 performs processing for transmitting the Authentication Request frame set in step S901 and receiving an Authentication Response frame from the communication apparatus 102. After completion of the Authentication processing, then in step S903, the communication apparatus 103 performs processing for transmitting an Association Request frame and receiving an Association Response frame from the communication apparatus 102. After completion of the Association processing, then in step S904, the communication apparatus 103 performs the 4WHS processing with the communication apparatus 102 to generate a PTK serving as an encryption key. In step S905, the communication apparatus 103 determines whether the communication apparatus established the connection via the link 1 is same as the communication apparatus established the connection via the link 2. Since there is no communication apparatus established a connection earlier, then in step S909, the communication apparatus 103 sets the PTK acquired in the link 1 to the wireless chip as the PTK of the link 1. This completes the connection processing of the link 1.

Then, in step S901, the communication apparatus 103 stores the identification information on the communication apparatus 102 in an Authentication Request frame in the link 2. Processing in steps S902 to S904 for the link 2 is similar to the processing in steps S902 to S904 for the link 1, respectively, according to the present exemplary embodiment, and the redundant descriptions will be omitted.

In step S905, the communication apparatus 103 determines whether the communication apparatus established the connection via the link 1 is same as the communication apparatus established the connection via the link 2. More specifically, the communication apparatus 103 determines whether the identification information on the communication apparatus 102 set in the Authentication Request frame in step S901 coincides with the identification information on the communication apparatus that has established the connection via the link 2. In a case where it is determined that the communication apparatuses are the same communication apparatus (YES in step S905), then in step S906, the communication apparatus 103 determines whether data communication is currently performed in the link 1. In a case where the communication apparatus 103 determines that data communication is currently performed in the link 1 (YES in step S906), then in step S907, the communication apparatus 103 sets the PTK of the link 2 to the wireless chip as the PTK of the link 2 without updating the PTK of the link currently performing data communication. This is because updating the PTK of the link currently performing data communication will interrupt data communication. In a case where the communication apparatus 103 determines that data communication is not currently performed in the link 1 (NO in step S906), then in step S908, the communication apparatus 103 sets the PTK generated in the 4WHS processing for the link 2 to the wireless chip as the PTK of the link 1. In step S909, the communication apparatus 102 sets the PTK generated in the 4WHS processing for the link 2 to the wireless chip as the PTK of the link 2. In a case where it is determined that the communication apparatuses are not the same communication apparatus (NO in step S905), then in step S909, the communication apparatus 103 sets the PTK generated in the 4WHS processing for the link 2 to the wireless chip as the PTK of the link 2.

Although, in the present exemplary embodiment, the identification information on the communication apparatus is stored in an Authentication Request frame, the information may be stored in a different frame, for example, in an Association Request frame.

According to the present exemplary embodiment, in a case where it is determined that the same communication apparatus has established the connection via the link 1 and the connection via the link 2, the same PTK can be used between the links by setting the encryption key generated in the link 2 as the encryption key of the link 1. In a case where the link 1 is currently performing communication, the encryption key of the link 1 is set as the encryption key of the link 2 to prevent communication interruption, whereby the same PTK can be used between the links. Further, using the PTK shared between the links enables communication without discarding normal data frames.

According to the present exemplary embodiment, not only the PTK but also the GTK is shared by the 4WHS processing. However, since it is necessary to use a different GTK in each link, the communication apparatuses 102 and 103 perform the 4WHS processing when establishing a new connection in each link.

A recording medium storing the program code of software for implementing the above-described functions may be supplied to a system or an apparatus, and the computer (CPU or MPU) of the system or the apparatus may read and execute the program code stored in the recording medium. In this case, the program code itself read from the storage medium implements the functions of the above-described exemplary embodiments, and the storage medium storing the program code configures the above-described apparatus.

Examples of usable storage media to supply a program code include a flexible disk, a hard disk, an optical disc, a magneto-optical disk, a CD-ROM, a CD-R, a magnetic tape, a nonvolatile memory card, a ROM, and a DVD.

The above-described functions may be implemented not only when the computer executes the read program code but also when the Operating System (OS) operating on the computer executes part or whole of the actual processing based on instructions of the program code. OS is an abbreviation for Operating System.

Further, the program code read by the storage medium is written to a memory included in a function expansion board inserted into the computer or a function expansion unit connected to the computer. The CPU included in the function expansion board or the function expansion unit may implement the above-described functions by executing part or whole of the actual processing based on instructions of the program code.

The present invention can also be achieved when a program for implementing at least one of the functions of the above-described exemplary embodiments is supplied to a system or an apparatus via a network or a storage medium, and at least one processor in a computer of the system or the apparatus reads and executes the program. Further, the present invention can also be achieved by a circuit (for example, an application specific integrated circuit (ASIC)) for implementing at least one function.

The present invention is not limited to the above-described exemplary embodiments but can be modified and changed in diverse ways without departing from the spirit and scope thereof. Therefore, the following claims are appended to disclose the scope of the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a case where a communication is performed via a plurality of frequency channels, the communication can be performed without discarding of normal data frames.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus capable of performing multilink communication conforming to the IEEE802.11 standard series, the communication apparatus comprising:
   a processor; and
   a memory in communication with the processor, the memory storing instructions that, when executed by the processor, cause the processor to:
   establish a first link and a second link via a frequency channel;
   set, in a case where a communication apparatus established a connection as a connection partner in the first link is same as a communication apparatus established a connection as a connection partner in the second link, a Pairwise Transient Key (PTK) to be shared between communication via the first link and communication via the second link; and
   determine, based on identification information on the communication apparatus as a connection partner in the first link and identification information on the communication apparatus as a connection partner in the second link, whether the communication apparatuses are a same communication apparatus.

2. The communication apparatus according to claim 1, wherein, in a case where the communication apparatuses are the same communication apparatus, a PTK set in the first link is set as a PTK to be used in the second link.

3. The communication apparatus according to claim 1, wherein, in a case where the communication apparatuses are the same communication apparatus, a PTK set in the second link is set as a PTK to be used in the first link.

4. The communication apparatus according to claim 1, wherein, in a case where the communication apparatuses are the same communication apparatus and communication via the first link is not currently performed, a PTK of the second link is set as a PTK to be used in the first link.

5. The communication apparatus according to claim 1, wherein, in a case where the communication apparatuses are the same communication apparatus, and communication via the first link is currently performed, a PTK set in the first link is set as a PTK to be used in the second link.

6. The communication apparatus according to claim 1, wherein, in a case where the communication apparatuses are not the same communication apparatus, a PTK generated in the second link is set as a PTK to be used in the second link.

7. The communication apparatus according to claim 1, further comprising:
    receive the identification information on the communication apparatus as a connection partner in the first link from the communication apparatus as a connection partner in the first link; and
    receive the identification information on the communication apparatus as a connection partner in the second link from the communication apparatus as a connection partner in the second link,
    wherein it is determined, based on the identification information received as the connection partner in the first link and the identification information received as the connection partner in the second link, whether the communication apparatus as a connection partner in the first link and the communication apparatus as a connection partner in the second link are a same communication apparatus.

8. The communication apparatus according to claim 1, further comprising:
    transmit the identification information on the communication apparatus as a connection partner in the first link to the communication apparatus as a connection partner in the first link; and
    transmit identification information on the communication apparatus as a connection partner in the second link to the communication apparatus as a connection partner in the second link,
    wherein it is determined, based on the identification information transmitted as the connection partner in the first link and the identification information transmitted as the connection partner in the second link, whether the communication apparatus as a connection partner in the first link and the communication apparatus as a connection partner in the second link are a same communication apparatus.

9. The communication apparatus according to claim 8, wherein the communication apparatus stores the identification information in a management frame.

10. The communication apparatus according to claim 1, wherein the identification information is Multi-Link Device ID (MLD ID).

11. The communication apparatus according to claim 1, wherein the PTK is generated by execution of 4 Way Handshake processing.

12. A method of communication of a communication apparatus capable of performing multilink communication conforming to the IEEE802.11 standard series, the method comprising:
    establishing a first link and a second link via a frequency channel; and
    setting, in a case where a communication apparatus as a connection partner in the first link established by the establishing is same as a communication apparatus as a connection partner in the second link established by the establishing, a Pairwise Transient Key (PTK) to be shared between communication via the first link and communication via the second link; and
    determining, based on identification information on the communication apparatus as a connection partner in the first link and identification information on the communication apparatus as a connection partner in the second link, whether the communication apparatuses are a same communication apparatus.

13. A non-transitory computer-readable storage medium storing a program for causing a computer to execute a method of communication of a communication apparatus capable of performing multilink communication conforming to the IEEE802.11 standard series, the method comprising:
    establishing a first link and a second link via a frequency channel;
    setting, in a case where a communication apparatus as a connection partner in the first link established by the connection unit is same as a communication apparatus as a connection partner in the second link, a Pairwise Transient Key (PTK) to be shared between communication via the first link and communication via the second link; and
    determining, based on identification information on the communication apparatus as a connection partner in the first link and identification information on the communication apparatus as a connection partner in the second link, whether the communication apparatuses are a same communication apparatus.

\* \* \* \* \*